(12) United States Patent
Ford

(10) Patent No.: US 7,711,826 B2
(45) Date of Patent: May 4, 2010

(54) REMOTE SURVIVABLE DHCP FOR A DHCP RELAY AGENT

(75) Inventor: Alan Ford, Hornsby (AU)

(73) Assignee: Cisco Technology, Inc., San Jose, CA (US)

( * ) Notice: Subject to any disclaimer, the term of this patent is extended or adjusted under 35 U.S.C. 154(b) by 1380 days.

(21) Appl. No.: 11/087,194

(22) Filed: Mar. 22, 2005

(65) Prior Publication Data

US 2006/0218252 A1    Sep. 28, 2006

(51) Int. Cl.
*G06F 15/16* (2006.01)

(52) U.S. Cl. .................. 709/227; 370/341; 370/431

(58) Field of Classification Search .............. 370/331, 370/338, 395.5, 401, 466; 455/435.1; 709/250, 709/220, 222, 224, 230, 225; 398/1
See application file for complete search history.

(56) References Cited

U.S. PATENT DOCUMENTS

| | | | | |
|---|---|---|---|---|
| 6,240,464 B1 * | 5/2001 | Fijolek et al. | ............... | 709/250 |
| 6,704,789 B1 * | 3/2004 | Ala-Laurila et al. | ......... | 709/230 |
| 6,782,422 B1 * | 8/2004 | Bahl et al. | ................... | 709/224 |
| 6,810,420 B1 * | 10/2004 | Buse et al. | ................... | 709/224 |
| 6,934,274 B2 * | 8/2005 | Inoue et al. | ................. | 370/338 |
| 6,952,428 B1 * | 10/2005 | Necka et al. | ................ | 370/466 |
| 7,016,328 B2 * | 3/2006 | Chari et al. | .................. | 370/331 |
| 7,099,338 B1 * | 8/2006 | Lee | ............. | 370/401 |
| 7,136,645 B2 * | 11/2006 | Hanson et al. | ........... | 455/435.1 |
| 7,239,643 B2 * | 7/2007 | Yoshida et al. | .............. | 370/401 |
| 2002/0138614 A1 * | 9/2002 | Hall | .......................... | 709/225 |
| 2003/0195954 A1 * | 10/2003 | Bahlmann | .................. | 709/222 |
| 2005/0105529 A1 * | 5/2005 | Arberg et al. | ............ | 370/395.5 |
| 2006/0155833 A1 * | 7/2006 | Matsuda et al. | ............. | 709/220 |
| 2008/0101793 A1 * | 5/2008 | Koch et al. | ..................... | 398/1 |

OTHER PUBLICATIONS

Droms, R., "*Dynamic Host Configuration Protocol*," RFC 2131, Mar. 1997, 45 pp.
Alexander, S. and Droms, R., "*DHCP Options and BOOTP Vendor Extensions*," RFC 2132, Mar. 1997, 34 pp.

* cited by examiner

*Primary Examiner*—Dustin Nguyen
(74) *Attorney, Agent, or Firm*—Weaver Austin Villeneuve & Sampson LLP

(57) ABSTRACT

A remote survivable DHCP technique is described for facilitating communications between nodes of a computer network. According to a specific embodiment, the network include a remote survivable DHCP (RSD) system adapted to enable a DHCP relay agent to temporarily respond, during at least a portion of times when the DHCP server is down or unreachable, to DHCP-related requests from clients that have already received a valid DHCP lease offer from a DHCP server during at least a portion of times when the DHCP server is down or unreachable.

51 Claims, 6 Drawing Sheets

REMOTE SURVIVABLE DHCP FOR A DHCP RELAY AGENT

BACKGROUND OF THE INVENTION

The present invention relates generally to computer network communications, and more specifically to techniques for providing remote survivable DHCP protocols implemented over to computer network.

The Dynamic Host Configuration Protocol (DHCP) provides a framework for passing configuration information to hosts on a Internet (e.g., TCP/IP) network. Typically a DHCP server provides configuration parameters specific to a DHCP client host requesting information to participate on the Internet network. DHCP also provides a mechanism for allocation of IP addresses to hosts. Configuration parameters and other control information are carried in tagged data items that are stored in the 'options' field of the DHCP message.

DHCP is built on a client-server model, where designated DHCP server hosts allocate network addresses and deliver configuration parameters to dynamically configured hosts. Generally, DHCP is designed to supply DHCP clients with the necessary configuration parameters to enable a DHCP client to exchange packets with any other host in the Internet.

Another service provided by DHCP is the allocation of temporary or permanent network (IP) addresses to clients. The basic mechanism for the dynamic allocation of network addresses is simple: a client requests the use of an address for some period of time. The allocation mechanism (the collection of DHCP servers) guarantees not to reallocate that address within the requested time and attempts to return the same network address each time the client requests an address. The period over which a network address is allocated to a client is referred to as a "lease". The client may extend its lease with subsequent requests. The client may issue a message to release the address back to the server when the client no longer needs the address. The client may ask for a permanent assignment by asking for an infinite lease. Even when assigning "permanent" addresses, a server may choose to give out lengthy but non-infinite leases to allow detection of the fact that the client has been retired.

Details of the Dynamic Host Configuration Protocol are described in RFC 2131 ("Dynamic Host Configuration Protocol", R. Droms, March 1997) and RFC 2132 ("DHCP Options and BOOTP Vendor Extensions", S. Alexander et al., March 1997), published by the Internet Engineering Task Force (www.ietf.org). Each of these references is incorporated herein by reference in its entirety for all purposes.

The following description provides a brief explanation of the various communications exchanged between a DHCP client and DHCP server for allocating a network address (e.g., and IP address). Initially, the client broadcasts a DHCPDISCOVER message on its local physical subnet. The DHCPDISCOVER message may include options that suggest values for the network address and lease duration. DHCP relay agents may pass the message on to DHCP servers not on the same physical subnet. A DHCP server may respond with a DHCPOFFER message that includes an available network address. When the client receives the DHCPOFFER messages from the DHCP server, it may respond by accepting the offer by sending a DHCPREQUEST message to the DHCP server. When the DHCP server receives the DHCPREQUEST broadcast from the client, it then commits the binding for the client to persistent storage and responds with a DHCPACK message containing the configuration parameters for the requesting client. The combination of 'client identifier' and assigned network address constitute a unique identifier for the client's lease and are used by both the client and server to identify a lease referred to in any DHCP messages. Assuming that the client receives the DHCPACK message, the configuration process is complete, and the client may begin using the assigned network address for the duration of the lease.

An issue may arise, however, if the client subsequently becomes temporarily disconnected from the network before the DHCP lease expires. For example, some devices (such as, for example, DOCSIS cable modems, client machines, routers, etc.) may a attempt to reacquire the DHCP lease from the DHCP server after being temporarily disconnected from the network, even when that device's current DHCP lease has not yet expired. This may result in an unnecessary consumption of network resources. Moreover, if the DHCP server is temporarily unavailable, the device will be unable to reacquire the DHCP lease and therefore unable to access other devices in the network.

Accordingly, it will be appreciated that there exists a need for improving DHCP-related operations in order to improve network performance and reliability.

SUMMARY OF THE INVENTION

Various embodiments of the present invention are directed to different methods, computer program products, and systems for facilitating communication between nodes of at least one computer network which includes a client system, a DHCP server system, and a DHCP relay agent configured or designed to facilitate communications between the client system and the DHCP server system. According to a specific embodiment, the network may also include a remote survivable DHCP (RSD) system adapted to enable the DHCP relay agent to temporarily respond, during at least a portion of times when the DHCP server is down or unreachable, to DHCP-related requests from clients that have already received a valid DHCP lease offer from the DHCP server. In one implementation, the RSD system may be adapted to periodically monitor the health of the DHCP server system, and may also be adapted to monitor information contained in messages (e.g., packets or datagrams) that are exchanged between the client system and the DHCP server system. When a DHCP-related request message sent from the client system to the DHCP server system is detected, and it is determined that the DHCP server system is unavailable, the RSD system may respond by retrieving information relating to a DHCP lease associated with the client system, wherein the DHCP lease includes DHCP lease information specifying a assigned network address and a first lease time value. Using at least a portion of the retrieved DHCP lease information, an updated lease time value associated with the DHCP lease may be calculated. A DHCP response message in response to the DHCP-related request message may then be generated, wherein the DHCP response message includes updated DHCP lease information specifying the assigned network address and the updated lease time value. According to a specific implementation the updated lease time value is calculated according to the formula: updated lease time value=first lease time value—time elapsed since initialization of the DHCP lease. In at least one embodiment, the RSD system may be implemented as a component of the DHCP relay agent.

An alternate embodiment of the present invention is directed to a technique for facilitating communication between nodes of at least one computer network which includes a client system, a DHCP server system, and a DHCP relay agent configured or designed to facilitate communications between the client system and the DHCP server system. A first DHCP lease is allocated to the client system. The first DHCP lease includes DHCP lease information relating to a network address and a first lease time value. A DHCPDISCOVER message from the client system is detected. Additionally, it is determined that the DHCP server system is unavailable. An updated lease time value to be associated with the DHCP lease is calculated. A DHCPOFFER message in response to the DHCPDISCOVER message is generated, wherein DHCPOFFER message includes parameters specifying the network address and the updated lease time value. According to a specific implementation, the DHCPOFFER message may then be transmitted to the client system in order to allow the client system to resume using the assigned network address specified in the first DHCP lease for the remaining duration of the first lease time value.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

As described in greater detail below, a Remote Survivable DHCP (RSD) technique is described for allowing DHCP Relay agents (such as, for example, router, switches, bridges, Cable Modem Termination Systems, etc.) to temporarily answer DHCP requests on behalf of clients that have already received a valid DHCP offer from a DHCP server when the DHCP server is down or unreachable. According to one implementation, the technique of the present invention may be implemented transparently to the clients and/or DHCP servers, without performing any modifications or reconfigurations at either the clients or DHCP servers.

Figure 1:
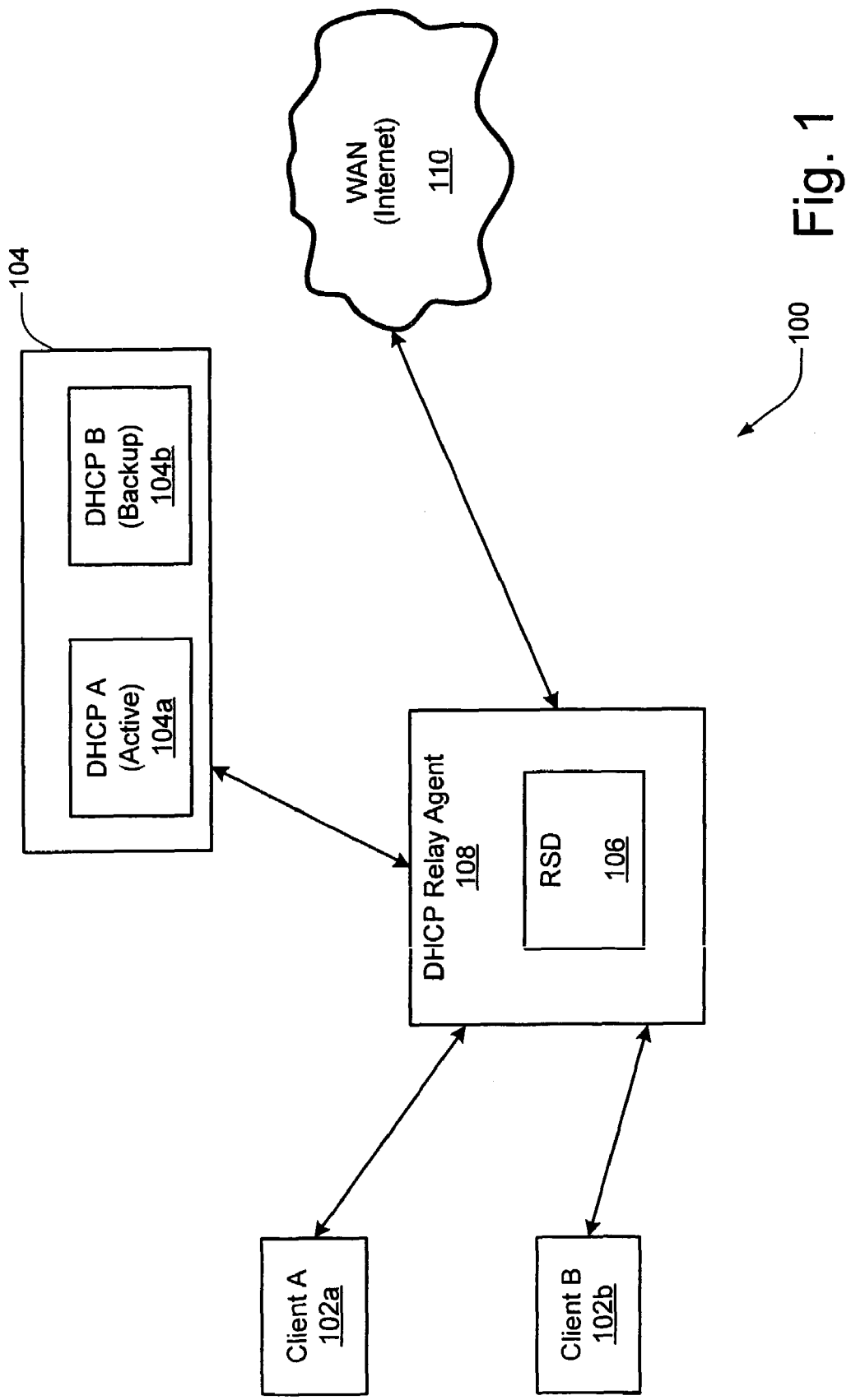
FIG. 1 shows a specific embodiment of a network portion 100 which may be used for illustrating various aspects of the present invention.

FIG. 1 shows a specific embodiment of a network portion 100 which may be used for illustrating various aspects of the present invention. As illustrated in FIG. 1, network portion 100 may include one or more clients (e.g., w102a, 102b), a DHCP server farm 104 which may include one or more DHCP servers, and at least one DHCP relay agent 108 which is configured to communicate with the DHCP server farm and an external network such as, for example, the Internet 110. In at least one implementation, the DHCP relay agent 108 may correspond to a network communication device such as, for example, a router, switch, bridge, Cable Modem Termination System (CMTS), etc. Examples of the different client devices may include client computer systems, routers (e.g., network gateway routers), cable modems, DSL modems, and/or other network devices which may require a DHCP lease for a network address in order to communicate with other network nodes.

As illustrated in the embodiment of FIG. 1, the DHCP relay agent includes a Remote Survivable DHCP (RSD) module 106 configured or designed to perform various functions for implementing the remote survivable DHCP technique of the present invention. In specific embodiments, the RSD module 106 may be implemented using software, hardware, or a combination of software and hardware.

According to a specific embodiment, the RSD module may be configured or designed to record DHCP lease parameters granted to DHCP clients that use a router as a DHCP relay agent. If the RSD module detects that the remote DHCP server is down then, in certain circumstances, the RSD module may begin answering DHCP clients' requests, for example, with parameters similar to those previously granted to the clients by the remote DHCP server.

Figure 2:
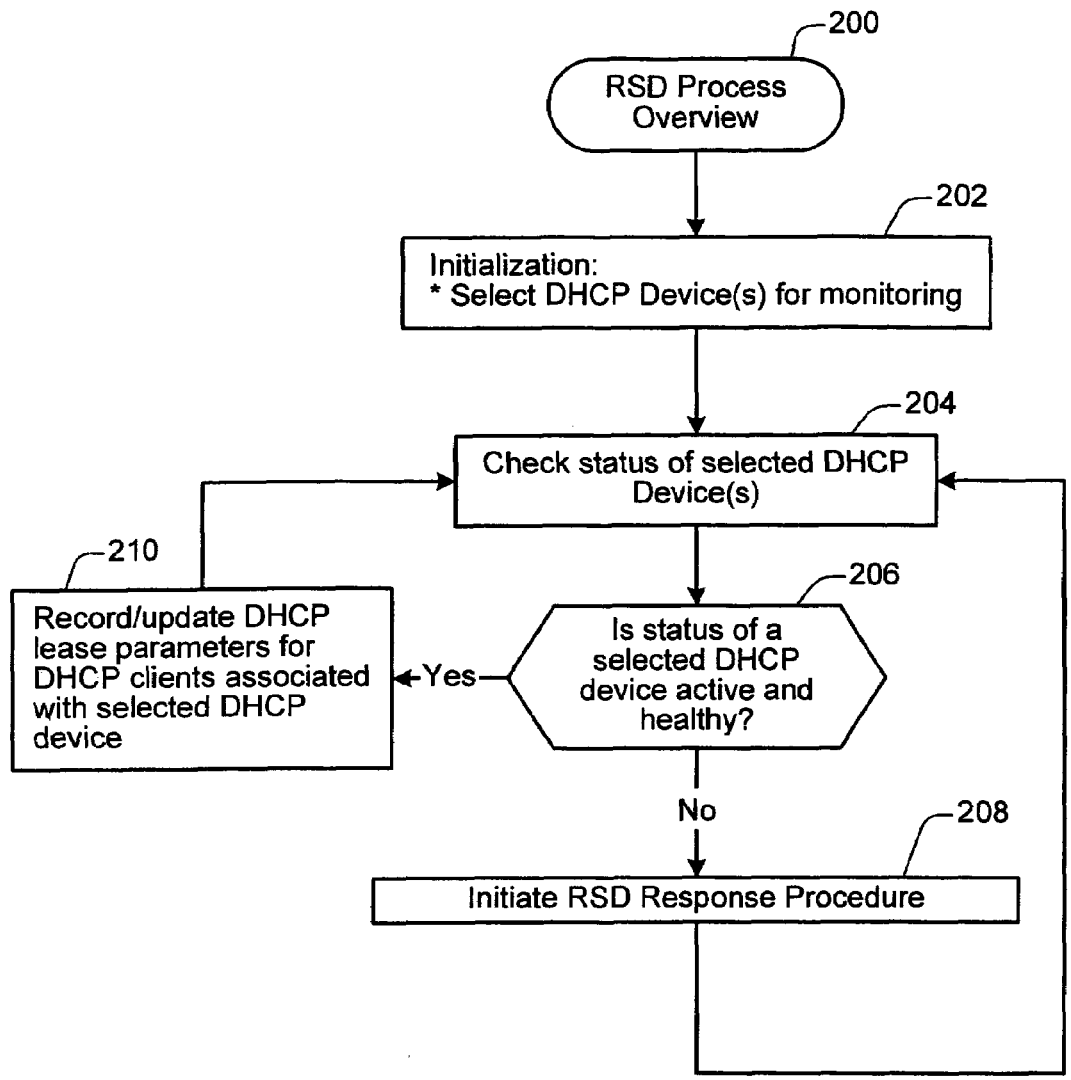
FIG. 2 shows a flow diagram of an RSD Process Overview procedure 200 in 20 accordance with a specific embodiment of the present invention.

FIG. 2 shows a flow diagram of an RSD Process Overview procedure 200 in accordance with a specific embodiment of the present invention. In at least one embodiment, the RSD Process Overview procedure 200 may be implemented at the RSD module 106 of FIG. 1. During initialization of the RSD module, one or more DHCP servers are selected (202) for monitoring by the RSD module. According to different embodiments, identification of the specific DHCP servers to be monitored may be determined, for example, using a manually configured file which includes the network addresses of the DHCP devices to be monitored. Alternatively, identification of the specific DHCP servers to be monitored may be determined using an automated process which may be configured or designed to automatically identified to one or more DHCP servers which respond to client requests via the DHCP relay agent. In at least one implementation, the RSD module may be configured or designed to monitor one or more DHCP servers, depending upon the number of DHCP servers which are communicating with the DHCP relay agent.

For purposes of illustration, it is assumed in this example that the RSD module 106 selects DHCP server A 104a for monitoring. Accordingly, the RSD module may then periodically check (204) the status of the selected DHCP device(s). According to specific embodiments, a variety of different techniques may be used for checking the status of a DHCP server, such as, for example, periodically pinging the DHCP server; periodically sending a DHCPDISCOVER message to the DHCP server to see if a reply message is returned; Monitoring the success rate of DHCP requests forwarded to the DHCP server by the DHCP relay agent; etc. Additionally, different threshold values may be assigned to each of the different status checking techniques to be used in determining the status of the DHCP server. In at least one embodiment, the DHCP status checking techniques may be implemented at or initiated by the DHCP relay agent.

At 206 a determination is made as to whether the status of a selected DHCP device (e.g., DHCP server) is active and healthy. If it is determined that the status of the selected DHCP device indicates that the device is active and healthy, the RSD module may then record and/or update (210) desired DHCP lease parameters and options for DHCP clients associated with the selected DHCP device. According to at least one implementation, the DHCP lease parameters and options selected to be recorded by the RSD module may be stored in a data structure (e.g., RSD table) in memory, such as, for example, memory located at the RSD module or the DHCP relay agent.

Figure 6:
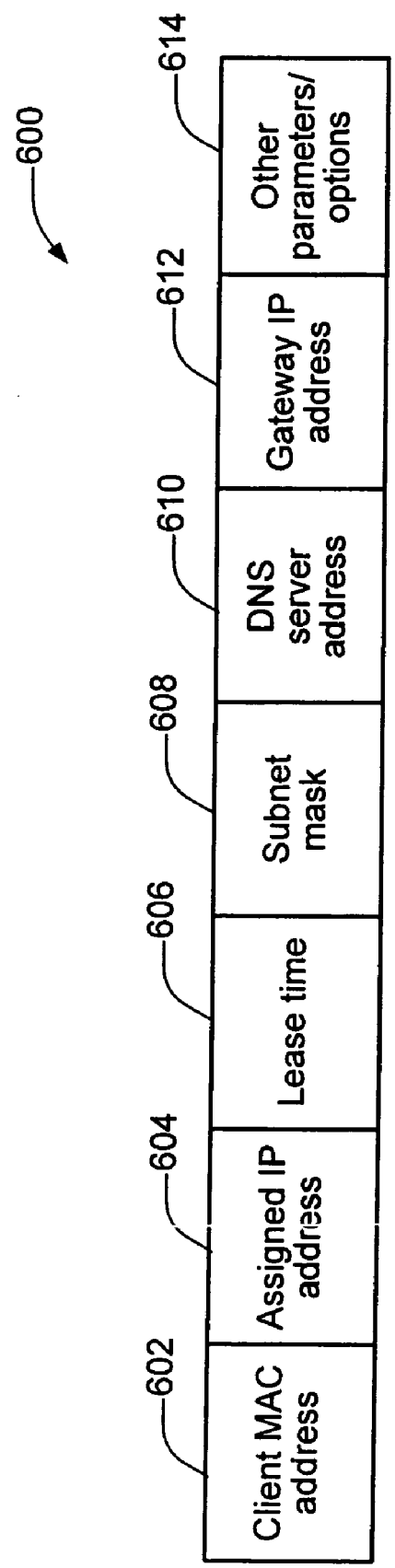
FIG. 6 shows an example of various information which may be stored in an RSD-related data structure in accordance with a specific embodiment of present invention.

FIG. 6 shows an example of various information which may be stored in an RSD-related data structure in accordance with a specific embodiment of present invention. In this example, information associated with the data structure entry 600 of FIG. 6 may correspond to information relating to a specific DHCP lease that has been granted to a specific client. Such information may include, for example, a clients identifier 602 (such as, for example, the client's MAC address), the client's assigned IP address 604, the lease time 606, subnet mask 608, DNS server address 610, gateway IP address 612 and/or other parameters/DHCP options. Examples of other parameters and/or DHCP options may include, for example, information relating to: DOCSIS domains, IP addresses of servers which may provide additional configuration options, DNS names, broadcast address, ARP cache timeout, MTU for the interface, NIS or servers, NIS or NIS+ domain, NTP Servers, SMTP server, TFTP server, WINS name server, etc. Additional DHCP options which may be recorded by the RSD module are described in greater detail in RFC 2132, previously incorporated by reference in its entirety for all purposes.

According to at least one implementation, the RSD module may be configured or designed to monitor packet header and payload information of packets traveling between DHCP servers and clients via the DHCP relay agent. In at least one embodiment, the monitored packet information may be used to select the specific DHCP servers which the RSD module is to monitor. Additionally, in at least one embodiment, the monitored packet information may be used to obtain the desired DHCP parameters and/or options to be stored in the RSD table or other RSD-related data structure. For example, if the RSD module detects a packet which includes information relating to a new DHCP lease for a particular client, the RSD module may respond by creating a new entry in the RSD table which includes specific information relating to the clients and the DHCP lease parameters/options. In another example, the RSD module may detect a packet which includes information relating to an extension of lease time for an existing DHCP lease associated with a particular client. In this example, the RSD module may respond by modifying or updating lease time information (and/or other information) in the RSD table entry associated with a particular client. As illustrated in the embodiment of FIG. 2, after the RSD module has finished recording/updating information in the RSD table, the RSD module may then continue to periodically check the status of selected DHCP devices as shown at 204.

Figure 3:
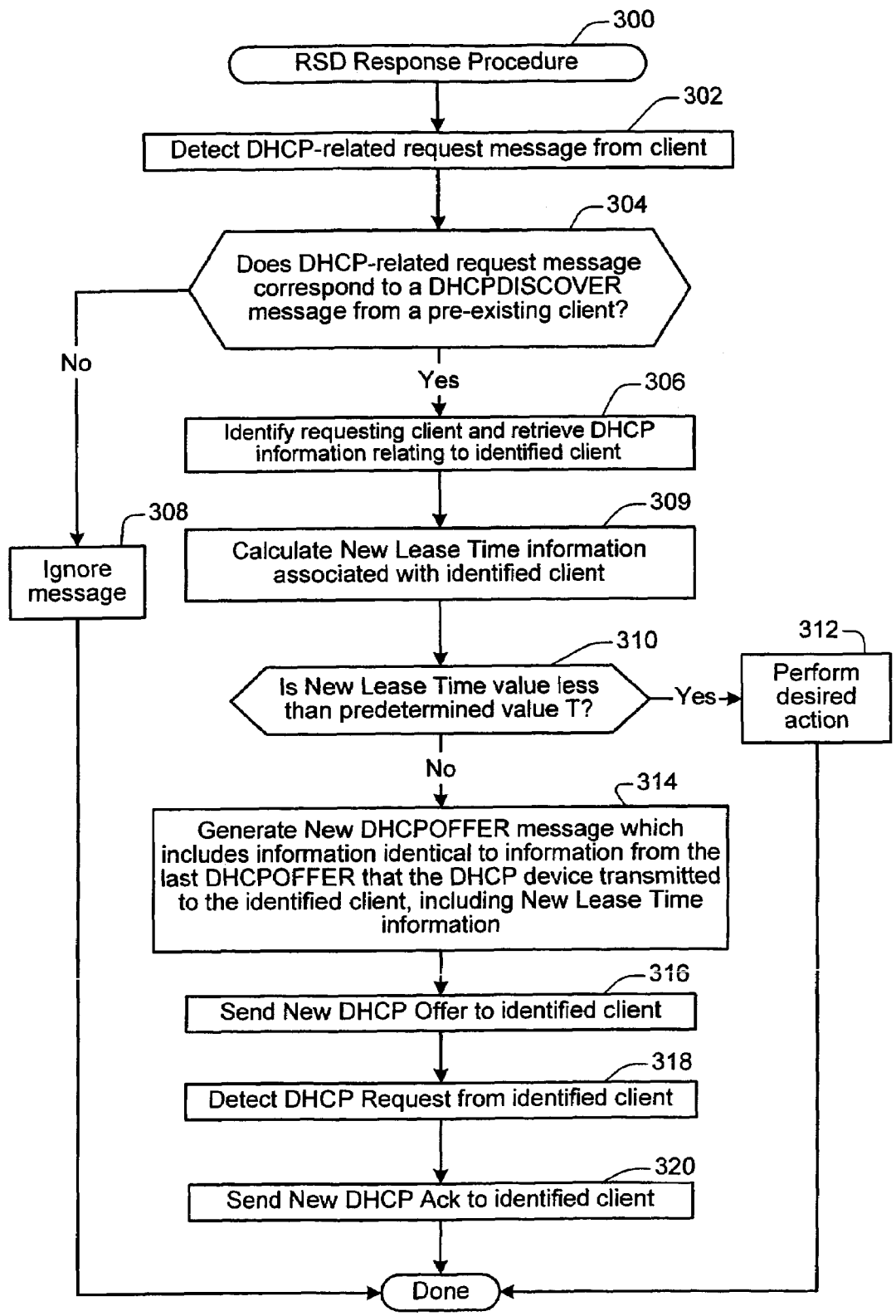
FIG. 3 shows a flow diagram of an RSD Response Procedure 300 in accordance with a specific embodiment of the present invention.

In at least one embodiment, if it is determined that the status of the selected DHCP device indicates that the device is not healthy and/or active, the RSD module may initiate (208) an RSD response procedure such as that illustrated, for example, in FIG. 3 of the drawings. Thereafter, the RSD module may then continue to periodically check the status of selected DHCP devices as shown at 204.

FIG. 3 shows a flow diagram of an RSD Response Procedure 300 in accordance with a specific embodiment of the present invention. According to one implementation, if a client performs a broadcast DHCP request while RSD module believes that the DHCP server is down, the DHCP request may be answered by the RSD module. In at least one embodiment, the response from the RSD module may be identical or substantially similar to the last DHCP offer that was transmitted by the .DHCP server, however, the lease time may be set to a "New Lease Time" value which is calculated to reflect the amount of time the RSD module believes the client's lease from the DHCP server still has to live.

During the RSD Response Procedure, the RSD module may monitor the packet flow at the DHCP relay agent for client DHCP-related messages. When the RSD module detects (302) a DHCP-related request message from a client, it may analyze the message to determine (304) whether the DHCP-related request message corresponds to a DHCPDISCOVER message from a pre-existing client. In at least one implementation, a pre-existing client may be defined as a client which has previously received a response from a DHCP server that the RSD module has selected for monitoring. For example, in one embodiment, a pre-existing client may be defined as a client which has already been allocated a DHCP lease from a DHCP server that the RSD module has selected for monitoring.

As shown in the example of FIG. 3, if it is determined that the DHCP-related request message does not correspond to a DHCPDISCOVER message from a pre-existing client, the message may be ignored (308) by the RSD module. Thus, for example, in one embodiment, the RSD would not respond to DHCPDISCOVER messages from non pre-existing clients since the RSD module will have no idea what parameters the DHCP server would want to assign to that client. Additionally, in at least one implementation the RSD module may be configured or designed to ignore DHCP Renewal Requests which indicate that the client is already operational and is merely trying to renew an existing lease. Additionally, the RSD module may be configured or designed to ignore broadcast DHCP Request messages which are indicative of a client that is not operational and needs a DHCP lease to become operational.

If, however, it is determined that the DHCP-related request message does correspond to a DHCPDISCOVER message from an existing client, the RSD module may respond by identifying (306) the client, and retrieving DHCP information relating to the identified client. In at least one implementation, the DHCP information may be retrieved from information stored in the RSD table, and may include DHCP lease information associated with the identified client. Using the retrieved client DHCP information, the RSD module may then calculate (309) a New Lease Time information associated with the identified client DHCP lease.

According to a specific embodiment, a New Lease Time value may be calculated using the following equation:

$$\text{New Lease Time} = \text{Lease Time Recorded for initial DHCP transaction} - (\text{Current Time} - \text{Time of initial DHCP transaction}) \quad (1)$$

Another way of expressing the new lease time calculation is according to the equation:

$$\text{New Lease Time} = \text{Lease Time Recorded for initial DHCP transaction} - \text{Time elapsed since initial DHCP transaction} \quad (2)$$

At 310 a determination is made as to whether the New Lease Time value is less than a predetermined threshold value T. In at least one implementation, the predetermined threshold value T may be configurable. For example, in one implementation, the predetermined threshold value T may be set equal to zero. Alternatively, the predetermined threshold value T may be set equal to a desired threshold value greater than zero, such as for example, a value within a range from 0 to 360 seconds.

If it is determined that the New Lease Time value is less than a predetermined threshold value T, the RSD module may respond by performing a specified action, which may be configurable. For example, according to one embodiment, if the New Lease Time value is less than zero, or some other configurable threshold, then the RSD module may respond by forwarding the DHCPDISCOVER message to the appropriate DHCP server in the hope that the server has come back on line. Alternatively, the RSD module may respond by dropping the packet. According to at least one embodiment, each type of RSD response may be individually configurable.

If it is determined that the New Lease Time value is not less than a predetermined threshold value T, the RSD module may respond by generating (314) and sending (316) a new DHCPOFFER message which includes information substantially identical to the information from the last DHCPOFFER that was provided by the DHCP server to the identified client. In at least one implementation, the new DHCPOFFER message may include a lease time value parameter which is equal to the New Lease Time value calculated at 309. In one embodiment, the RSD module may spoof the DHCP server when sending the new DHCPOFFER message to the identified client.

It is assumed in the example of FIG. 3 that when the client receives the new DHCPOFFER message, it response by sending a DHCPREQUEST message via the DHCP relay agent to the DHCP server. When the RSD module detects (318) the DHCPREQUEST message from the identified client, it made respond by sending (320) a DHCPACK message to the identified client. When the client receives the DHCPACK message, it may then conclude that it now has a DHCP lease (for a lease time=New Lease Time value) for using the assigned network address specified in the new DHCPOFFER message.

For purposes of illustration, the remote survivable DHCP technique of the present invention will not be described by way of example with reference to FIG. 1 of the drawings. In this example, it is assumed that Client A 102a has obtained (at time t=0) a valid DHCP lease from DHCP Server A 104a for using IP Address A, with a lease time=100. At time t=40, it is assumed that Client A restarts, and attempts to acquire a new DHCP lease from DHCP Server A because it is unaware of its existing DHCP lease which remains valid until time t=100. Additionally, at time t=40, the RSD module detects that DHCP Server A is unavailable. At time t=42 Client A broadcasts a DHCPDISCOVER message to DHCP Server A via DHCP relay agent 108, which is detected by RSD module 106. Because Client A is identified as a pre-existing client, the RSD module calculates a New Lease Time value according to: New Lease Time=100−42=58. Using the New Lease Time information, the RSD module generates and transmits a new DHCPOFFER message to Client A which includes information identical to the information from the last DHCPOFFER message that was provided to Client A by the DHCP Server A, with the exception that the lease time specified in the new DHCPOFFER message is lease time=New Lease Time=58 (rather than lease time=100). When Client A receives the new DHCPOFFER message, it response by sending a DHCPREQUEST message via the DHCP relay agent to the DHCP Server A. When the RSD module detects the DHCPREQUEST message from the Client A, it responds by sending a DHCPACK message back to Client A. Upon receiving the DHCPACK message, Client A concludes that it now has a valid DHCP lease for using IP Address A with a lease time=58.

It will be appreciated that the remote survivable DHCP technique of the present invention provides a mechanism for allowing DHCP relay agents (such as, for example, router, switches, bridges, Cable Modem Termination Systems, etc.) to temporarily answer DHCP requests on behalf of clients that have already received a valid DHCP offer from a DHCP server when the DHCP server is down or unreachable. Moreover, the remote survivable DHCP technique of the present invention provides a mechanism for facilitating a decrease in the amount of time it takes for a client (or network device) to come back on-line. For instance, in the example above, Client A would ordinarily not be able to come back on-line until after DHCP Server A came back on-line and provided Client A with a new DHCP lease. However, using the technique of the present invention, Client A was able to immediately come back on-line using its pre-existing, unexpired DHCP lease, despite the fact that DHCP Server A was unreachable at that time.

Moreover, it will be appreciated that the DHCP server redundancy techniques are not able to account for every potential permutation of network outage between a DHCP relay agent and DHCP server farm. However, the remote survivable DHCP technique of the present invention is able to accommodate clients in network outage situations. This may be viewed as an important feature for clients (such as, for example, DOCSIS cable modems) which are configured to reacquire a DHCP lease after going offline for even a brief period of time.

Additionally, it will be appreciated that the embedding of a DHCP server in a router (or CMTS) on every network within a system would not only be difficult to manage, but would also be costly in terms of memory and code size if the embedded DHCP servers were to be provided with all the functionality of a conventional DHCP server. However, using the remote survivable DHCP technique of the present invention, it is possible for all desired DHCP parameters/options to be implemented or specified at a selected DHCP server, and then have the RSD module use the DHCP parameters/options specified at a selected DHCP server to echo the same parameters/options when performing its operations.

Cable Network Embodiments

In at least one embodiment the remote survivable DHCP technique of the present invention may be implemented in a cable network. Typically, a cable network or "cable plant" employs cable modems, which are an improvement of conventional PC data modems and provide high speed connectivity.

Figure 4:
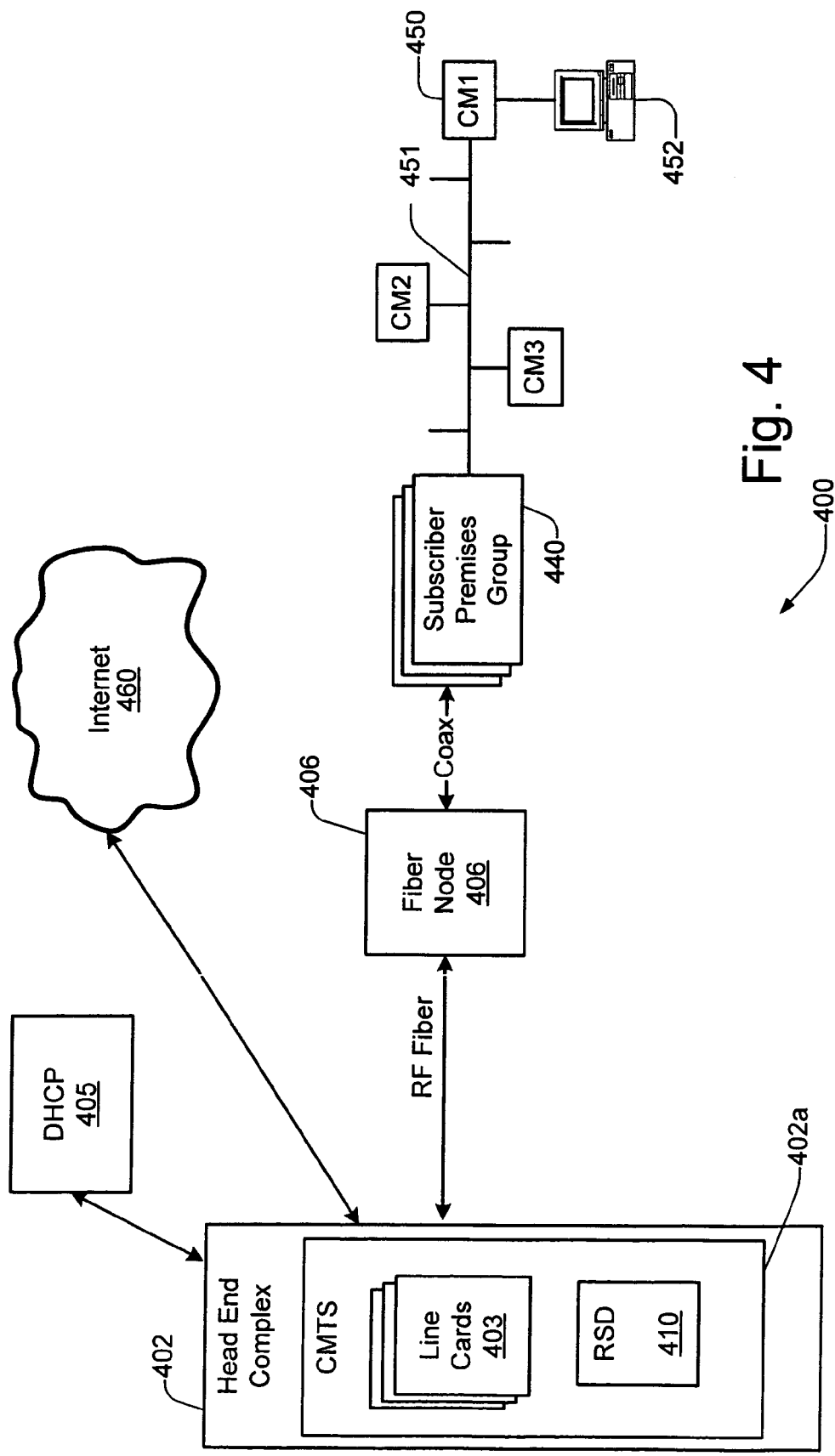
FIG. 4 shows a block diagram of a specific embodiment of a two-way hybrid fiber-coaxial (HFC) cable network 400 which may be used for implements and various aspects the present invention.

FIG. 4 shows a block diagram of a specific embodiment of a two-way hybrid fiber-coaxial (HFC) cable network 400 which may be used for implements and various aspects the present invention. As shown in FIG. 4, the cable network 400 includes a 25 Head End complex 402. The Head End complex 402 may include a plurality of components and/or systems (not shown) such as, for example, a Head End, a super Head End, a hub, a primary hub, a second hub, etc. Additionally, as shown in FIG. 4, the Head End complex 402 typically includes a Cable Modem Termination System (CMTS) 402a. Typical functions of the CMTS include (1) receiving data inputs from external sources and converting the data for transmission over the cable plant; (2) providing appropriate Media Access Control (MAC) level packet headers for data received by the cable system; (3) modulating and demodulating the data to and from the cable network; (4) functioning as a DHCP relay device between cable modems (e.g., 450) and DHCP server(s) (e.g., 405), etc. Typically, the Head End complex 402 is configured to provide a communication interface between nodes (e.g. cable modems) in the cable network and external networks such as, for example, the Internet 460. The cable modems typically reside at the subscriber premises 440A-D.

As illustrated in FIG. 4, the CMTS 402a may include one or more line cards 403 which may be used to implement certain aspects of the present invention. According to a specific embodiment, the line cards 403 may be configured or designed to implement selected aspects of the well known DOCSIS functionality. In the specific embodiment as shown in FIG. 4, line cards 403 may provide functions on several network layers, including a physical layer, and a Media Access Control (MAC) layer. Generally, the physical layer is responsible for receiving and transmitting RF signals on the cable plant. Hardware portions of the physical layer include at least one downstream modulator and transmitter and/or at least one upstream demodulator and receiver. The line cards may also include software or computer instructions for controlling components of the physical and network layers.

As illustrated in the embodiment of FIG. 4, the CMTS 102*a* may also include at least one RSD module 410. In specific embodiments, the RSD module 410 may be implemented using software, hardware, or a combination of software and hardware. In at least one implementation, the remote survivable DHCP technique of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the techniques of this invention may be implemented on a general-purpose network host machine such as a personal computer or workstation. Further, the invention may be at least partially implemented on a card (e.g., line card 403) for a network device or a general-purpose computing device.

As illustrated in FIG. 4, the Head End Complex 402 is typically connected to one or more fiber nodes 406 in the cable network. Each fiber node is, in turn, configured to service one or more subscriber groups 440. Each subscriber group typically comprises about 500 to 2000 households. A primary function of the fiber nodes 406 is to provide an optical-electronic signal interface between the Head End Complex 402 and the plurality of cable modems residing at the plurality of subscriber groups 440.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 2.0 RF Interface Specification (document control number CM-SP-RFIv2.0-107-041210, Dec. 10, 2004). That document is incorporated herein by reference for all purposes.

Communication between the Head End Complex 402 and fiber node 406 is typically implemented using modulated optical signals which travel over fiber optic cables. Each of the fiber nodes 406 is connected by a coaxial cable 407 to a respective group of cable modems residing at subscriber premises 440. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

Typically when a DOCSIS cable modem falls offline temporarily (due, for example, to cable system noise or a modem being power cycled), the cable modem is forced by the DOCSIS specification to re-perform the DHCP lease acquisition process, even if its DHCP lease has not yet expired. If the cable modem is unable to acquire a DHCP lease (for example, due to a network outage between the CMTS and DHCP server, or due to a DHCP server failure) then the cable modem will not proceed to come online, and hence an end user connected to the cable modem would lose IP connectivity and potentially Voice over IP connectivity. By implementing a scheme such as Remote Survivable DHCP, a brief network outage between the CMTS and the DHCP servers need not stop a cable modem that has already been online from coming back online in the same manner that it had before.

Other Embodiments

Generally, the remote survivable DHCP techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the remote survivable DHCP technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the DHCP relay agent and/or RSD devices of this invention may be specially configured routers or servers such as specially configured router models 1600, 2500, 2600, 3600, 4500, 4700, 7200, 7500, 10012 and 12000 available from Cisco Systems, Inc. of San Jose, Calif. A general architecture for some of these machines will appear from the description given below. In an alternative embodiment, the remote survivable DHCP technique of this invention may be implemented on a general-purpose network host machine such as a personal computer or workstation. Further, the invention may be at least partially implemented on a card (e.g., an interface card) for a network device or a general-purpose computing device.

Figure 5:
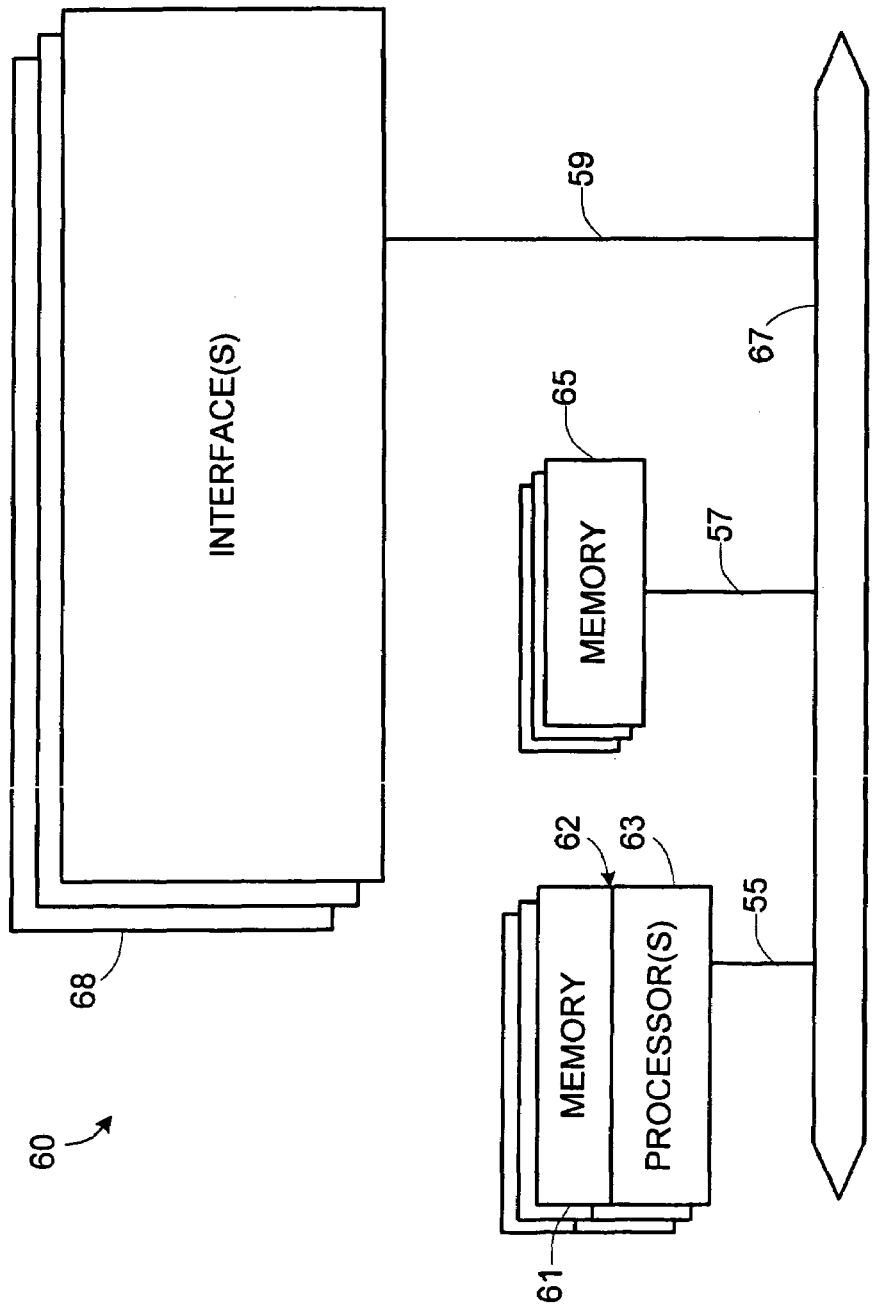
FIG. 5 show a network device 60 suitable for implementing aspects of the remote survivable DHCP techniques of the present invention

Referring now to FIG. 5, a network device 60 suitable for implementing aspects of the remote survivable DHCP techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as an RSD device, the CPU 62 may be responsible for analyzing packets, encapsulating packets, forwarding packets to appropriate network devices, monitoring packet headers and payloads, storing DHCP-related parameters/options, calculating New Least Time values, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the remote survivable DHCP techniques described herein. The program instructions may control the operation of an operating system and/or one or more applications, for example. The memory or memories may also be configured to store data structures, DHCP-related information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for facilitating communication between nodes of at least one computer network, the computer network including a first client system, a first DHCP server system, and a first DHCP relay agent, the first DHCP relay agent being configured or designed to facilitate communications between the first client system and the first DHCP server system, the method comprising:
   detecting a first DHCP-related request message sent from the first client system to the first DHCP server system;
   determining that the first DHCP server system is unavailable;
   in response to determining that the first DHCP server system is unavailable:
      retrieving information relating to a first DHCP lease associated with the first client system, the first DHCP lease including DHCP lease information specifying a first assigned network address and a first lease time value;
      calculating, using at least a portion of the retrieved DHCP lease information, an updated lease time value to be associated with the first DHCP lease; and
      comparing the updated lease time value against a predetermined threshold value T; and
      generating and sending a first DHCP response message in response to the first DHCP-related request message based upon a result of comparing the updated lease time value against the predetermined threshold value T, wherein the first DHCP response message includes updated DHCP lease information specifying the first assigned network address and the updated lease time value, wherein sending the first DHCP response message is performed without waiting until the first DHCP server system is available.

2. A method for facilitating communication between nodes of at least one computer network, the computer network including a first client system, a first DHCP server system, and a first DHCP relay agent, the first DHCP relay agent being operable to facilitate communications between the first client system and the first DHCP server system, the method comprising:
   detecting a first DHCP-related request message sent from the first client system to the first DHCP server system;
   determining that the first DHCP server system is unavailable; and
   initiating a first set of operations in response to detecting that the first DHCP server system is unavailable, wherein the first set of operations includes:
      retrieving information relating to a first DHCP lease associated with the first client system, the first DHCP lease including DHCP lease information specifying a first assigned network address and a first lease time value;

calculating, using at least a portion of the retrieved DHCP lease information, an updated lease time value to be associated with the first DHCP lease;

comparing the updated lease time value against a predetermined threshold value T; and generating and sending a first DHCP response message in response to the first DHCP-related request message according to a result of comparing the updated lease time value against the predetermined threshold value T, wherein the first DHCP response message includes updated DHCP lease information specifying the first assigned network address and the updated lease time value, wherein sending the first DHCP response message is performed without waiting until the first DHCP server system is available.

3. The method of claim 2 further comprising:
periodically pinging the first DHCP server system in order to detect whether the first DHCP server system is unavailable.

4. The method of claim 2 further comprising:
periodically generating and sending DHCPDISCOVER messages to the first DHCP server system in order to detect whether the first DHCP server system is unavailable.

5. The method of claim 2 further comprising:
monitoring a success rate of DHCP requests forwarded to the first DHCP server in order to detect whether the first DHCP server system is unavailable.

6. The method of claim 2 wherein the first DHCP response message is generated by the first DHCP relay agent, the method further comprising transmitting the first DHCP response message from the first DHCP relay agent to the first client system.

7. The method of claim 2 wherein the first DHCP response message corresponds to a spoofed DHCPOFFER generated by the first DHCP relay agent spoofing the first DHCP server system, the spoofed DHCPOFFER message including an updated DHCP lease offer specifying the first assigned network address and the updated lease time value.

8. The method of claim 2 further comprising:
detecting a DHCPOFFER message sent from the first DHCP server system to the first client system, the DHCPOFFER message including DHCP lease information specifying an assigned network address, and a lease time value.

9. The method of claim 2 wherein the first DHCP response message is not generated by a DHCP server system.

10. The method of claim 2:
wherein the first DHCP lease information includes information relating to a first timestamp value corresponding to a time when the first DHCP lease was established; and
wherein the updated lease time value is calculated according to:
updated lease time value=first lease time value−(current timestamp value−first timestamp value).

11. The method of claim 2:
wherein the updated lease time value is calculated according to:
updated lease time value=first lease time value−time elapsed since initialization of the first DHCP lease.

12. The method of claim 2 further comprising:
monitoring information contained in messages that are exchanged between the first client system and the first DHCP server system; and recording at least a portion of DHCP-related information obtained from the monitored messages.

13. The method of claim 2 wherein the first DHCP-related request message corresponds to a DHCPDISCOVER message, the method further comprising determining whether the first client system has associated therewith an unexpired DHCP lease.

14. The method of claim 2 further comprising generating and sending the first DHCP response message only in response to a determination that the updated lease time value exceeds the predetermined threshold value T.

15. The method of claim 2:
wherein the computer network corresponds to a cable network;
wherein the first client system corresponds to a cable modem; and
wherein the first DHCP relay agent corresponds to a Cable Modem Termination System (CMTS).

16. The method of claim 2 wherein the computer network further comprising a first remote survivable DHCP system adapted to enable the first DHCP relay agent to temporarily respond, during at least a portion of times when the first DHCP server is down or unreachable, to DHCP-related requests from clients that have already received a valid DHCP lease offer from the first DHCP server.

17. A method for facilitating communication between nodes of at least one computer network, the computer network including a first client system, a first DHCP server system, and a first DHCP relay agent, the first DHCP relay agent being operable to facilitate communications between the first client system and the first DHCP server system, the method comprising:

allocating a first DHCP lease to the first client system, the first DHCP lease including first DHCP lease information relating to a first network address and a first lease time value;

detecting a DHCPDISCOVER message from the first client system;

determining that the first DHCP server system is unavailable;

initiating a first set of operations in response to detecting that the first DHCP server system is unavailable, wherein the first set of operations includes:

calculating an updated lease time value to be associated with the first DHCP lease, wherein the updated lease time value is unrelated to a time during which the first DHCP server system is unavailable;

comparing the updated lease time value against a predetermined threshold value T; and generating and sending, at the DHCP relay agent, a DHCPOFFER message in response to the DHCPDISCOVER message based upon a result of comparing the updated lease time value against the predetermined threshold value T, wherein DHCPOFFER message includes parameters specifying the first network address and the updated lease time value, wherein sending the DHCPOFFER message is performed without waiting until the first DHCP server system is available.

18. The method of claim 17 wherein the DHCPOFFER message includes DHCP lease parameters identical to DHCP lease parameters specified in the first DHCP lease, with the exception that a value of the lease time parameter is equal to the updated lease time value.

19. The method of claim 17 further comprising generating and sending the first DHCP response message only in response to a determination that the updated lease time value exceeds the predetermined threshold value T.

20. The method of claim 17
wherein the first DHCP lease information includes information relating to a first timestamp value corresponding to a time when the first DHCP lease was established; and
wherein the updated lease time value is calculated according to:
updated lease time value=first lease time value−(current timestamp value−first timestamp value).

21. The method of claim 17 wherein the updated lease time value is calculated according to:
updated lease time value=first lease time value−time elapsed since initialization of the first DHCP lease.

22. The method of claim 17 wherein the first DHCP response message corresponds to a spoofed DHCPOFFER generated by the first DHCP relay agent spoofing the first DHCP server system, the spoofed DHCPOFFER message including an updated DHCP lease offer specifying the first assigned network address and the updated lease time value.

23. The method of claim 17 wherein the computer network further comprising a first remote survivable DHCP system adapted to enable the first DHCP relay agent to temporarily respond, during at least a portion of times when the first DHCP server is down or unreachable, to DHCP-related requests from clients that have already received a valid DHCP lease offer from the first DHCP server.

24. A system for facilitating communication between nodes of at least one computer network, the computer network including a first client system, a first DHCP server system, and a first DHCP relay agent, the first DHCP relay agent being operable to facilitate communications between the first client system and the first DHCP server system, the system comprising:
at least one processor;
at least one interface operable to provide a communication link to at least one other network device in the data network; and
memory;
the system being operable to:
detect a first DHCP-related request message sent from the first client system to the first DHCP server system;
retrieve, in response to detecting that the first DHCP server system is unavailable, information relating to a first DHCP lease associated with the first client system, the first DHCP lease including DHCP lease information specifying a first assigned network address and a first lease time value;
calculate, using at least a portion of the retrieved DHCP lease information and in response to detecting that the first DHCP server system is unavailable, an updated lease time value to be associated with the first DHCP lease, wherein the updated lease time value is unrelated to a time during which the first DHCP server system is unavailable;
compare the updated lease time value against a predetermined threshold value T; and
generate and send, in response to detecting that the first DHCP server system is unavailable, a first DHCP response message in response to the first DHCP-related request message according to a result of comparing the updated lease time value against the predetermined threshold value T, wherein the first DHCP response message includes updated DHCP lease information specifying the first assigned network address and the updated lease time value, wherein the first DHCP response message is sent without waiting until the first DHCP server system is available.

25. The system of claim 24 being further operable to:
periodically ping the first DHCP server system in order to detect whether the first DHCP server system is unavailable.

26. The system of claim 24 being further operable to:
periodically generate and send DHCPDISCOVER messages to the first DHCP server system in order to detect whether the first DHCP server system is unavailable.

27. The system of claim 24 being further operable to:
monitor a success rate of DHCP requests forwarded to the first DHCP server in order to detect whether the first DHCP server system is unavailable.

28. The system of claim 24 wherein the first DHCP response message is generated by the first DHCP relay agent, the system being further operable to transmit the first DHCP response message from the first DHCP relay agent to the first client system.

29. The system of claim 24 wherein the first DHCP response message corresponds to a spoofed DHCPOFFER generated by the first DHCP relay agent spoofing the first DHCP server system, the spoofed DHCPOFFER message including an updated DHCP lease offer specifying the first assigned network address and the updated lease time value.

30. The system of claim 24 being further operable to:
detect a DHCPOFFER message sent from the first DHCP server system to the first client system, the DHCPOFFER message including DHCP lease information specifying an assigned network address, and a lease time value.

31. The system of claim 24 wherein the first DHCP response message is not generated by a DHCP server system.

32. The system of claim 24
wherein the first DHCP lease information includes information relating to a first timestamp value corresponding to a time when the first DHCP lease was established; and
wherein the updated lease time value is calculated according to:
updated lease time value=first lease time value−(current timestamp value−first timestamp value).

33. The system of claim 24 wherein the updated lease time value is calculated according to:
updated lease time value=first lease time value−time elapsed since initialization of the first DHCP lease.

34. The system of claim 24 being further operable to:
monitor information contained in messages that are exchanged between the first client system and the first DHCP server system; and
record at least a portion of DHCP-related information obtained from the monitored messages.

35. The system of claim 24 wherein the first DHCP-related request message corresponds to a DHCPDISCOVER message, the system being further operable to determine whether the first client system has associated therewith an unexpired DHCP lease.

36. The system of claim 24 being further operable to generate and send the first DHCP response message only in response to a determination that the updated lease time value exceeds the predetermined threshold value T.

37. The system of claim 24:
wherein the computer network corresponds to a cable network;
wherein the first client system corresponds to a cable modem; and wherein the first DHCP relay agent corresponds to a Cable Modem Termination System (CMTS).

38. The system of claim 24 wherein the system corresponds to a remote survivable DHCP system adapted to enable the first DHCP relay agent to temporarily respond, during at least a portion of times when the first DHCP server is down or unreachable, to DHCP-related requests from clients that have already received a valid DHCP lease offer from the first DHCP server.

39. A system for facilitating communication between nodes of at least one computer network, the computer network including a first client system, a first DHCP server system, and a first DHCP relay agent, the first DHCP relay agent being operable to facilitate communications between the first client system and the first DHCP server system, the system comprising:
- at least one processor;
- at least one interface operable to provide a communication link to at least one other network device in the data network; and
- memory;
- the system being operable to allocate a first DHCP lease to the first client system, the first DHCP lease including first DHCP lease information relating to a first network address and a first lease time value;
- the system being operable to detect a DHCPDISCOVER message from the first client system;
- the system being operable to determine that the first DHCP server system is unavailable;
- the system being operable to calculate, in response to detecting that the first DHCP server system is unavailable, an updated lease time value to be associated with the first DHCP lease, wherein the updated lease time value is unrelated to a time during which the first DHCP server system is unavailable;
- the system being operable to compare the updated lease time value against a predetermined threshold value T; and
- the system being operable to generate and send, at the first DHCP relay agent and in response to detecting that the first DHCP server system is unavailable, a DHCPOFFER message in response to the DHCPDISCOVER message according to a result of comparing the updated lease time value against a predetermined threshold value T, wherein DHCPOFFER message includes parameters specifying the first network address and the updated lease time value.

40. The system of claim 39 wherein the DHCPOFFER message includes DHCP lease parameters identical to DHCP lease parameters specified in the first DHCP lease, with an exception that a value of the lease time parameter is equal to the updated lease time value.

41. The system of claim 39 being further operable to generate and send the first DHCP response message only in response to a determination that the updated lease time value exceeds the predetermined threshold value T.

42. The system of claim 39:
- wherein the first DHCP lease information includes information relating to a first timestamp value corresponding to a time when the first DHCP lease was established; and
- wherein the updated lease time value is calculated according to:
- updated lease time value=first lease time value−(current timestamp value−first timestamp value).

43. The system of claim 39 wherein the updated lease time value is calculated according to:

updated lease time value=first lease time value−time elapsed since initialization of the first DHCP lease.

44. The system of claim 39 wherein the first DHCP response message corresponds to a spoofed DHCPOFFER generated by the first DHCP relay agent spoofing the first DHCP server system, the spoofed DHCPOFFER message including an updated DHCP lease offer specifying the first assigned network address and the updated lease time value.

45. The system of claim 39 wherein the system corresponds to a remote survivable DHCP system adapted to enable the first DHCP relay agent to temporarily respond, during at least a portion of times when the first DHCP server is down or unreachable, to DHCP-related requests from clients that have already received a valid DHCP lease offer from the first DHCP server.

46. A system for facilitating communication between nodes of at least one computer network, the computer network including a first client system, a first DHCP server system, and a first DHCP relay agent, the first DHCP relay agent being operable to facilitate communications between the first client system and the first DHCP server system, the method comprising:
- at least one processor;
- memory;
- means for detecting a first DHCP-related request message sent from the first client system to the first DHCP server system;
- means for determining that the first DHCP server system is unavailable;
- means for retrieving, in response to detecting that the first DHCP server system is unavailable, information relating to a first DHCP lease associated with the first client system, the first DHCP lease including DHCP lease information specifying a first assigned network address and a first lease time value;
- means for calculating, using at least a portion of the retrieved DHCP lease information and in response to detecting that the first DHCP server system is unavailable, an updated lease time value to be associated with the first DHCP lease, wherein the updated lease time value is unrelated to a time during which the first DHCP server system is unavailable;
- means for comparing the updated lease time value against a predetermined threshold value T; and
- means for generating, in response to detecting that the first DHCP server system is unavailable, a first DHCP response message in response to the first DHCP-related request message according to a result of comp arm g the updated lease time value against the predetermined threshold value T, wherein the first DHCP response message includes updated DHCP lease information specifying the first assigned network address and the updated lease time value.

47. A system for facilitating communication between nodes of at least one computer network, the computer network including a first client system, a first DHCP server system, and a first DHCP relay agent, the first DHCP relay agent being operable to facilitate communications between the first client system and the first DHCP server system, the method comprising:
- at least one processor;
- memory;
- means for allocating a first DHCP lease to the first client system, the first DHCP lease including first DHCP lease information relating to a first network address and a first lease time value;

means for detecting a DHCPDISCOVER message from the first client system;

means for determining that the first DHCP server system is unavailable;

means for calculating, in response to detecting that the first DHCP server system is unavailable, an updated lease time value to be associated with the first DHCP lease, wherein the updated lease time value is unrelated to a time during which the first DHCP server system is unavailable;

means for comparing the updated lease time value against a predetermined threshold value T; and means for generating and sending, at the DHCP relay agent and in response to detecting that the first DHCP server system is unavailable, a DHCPOFFER message in response to the DHCPDISCOVER message based upon comparing the updated lease time value against the predetermined threshold value T, wherein DHCPOFFER message includes parameters specifying the first network address and the updated lease time value, wherein sending the DHCPOFFER message is performed without waiting until the first DHCP server system is available.

48. The method as recited in claim 1, wherein the first DHCP lease information includes information relating to a first timestamp value corresponding to a time when the first DHCP lease was established and wherein the updated lease time value is calculated according to updated lease time value=first lease time value−(current timestamp value−first timestamp value).

49. The method as recited in claim 1, wherein the updated lease time value is calculated according to:
updated lease time value=first lease time value−time elapsed since initialization of the first DHCP lease.

50. The method as recited in claim 1, wherein the updated lease time value is unrelated to a time during which the first DHCP server system is unavailable.

51. The method as recited in claim 2, wherein the updated lease time value is unrelated to a time during which the first DHCP server system is unavailable.

* * * * *